D. White,
Brush.
No. 84,327. Patented Nov. 24, 1868.
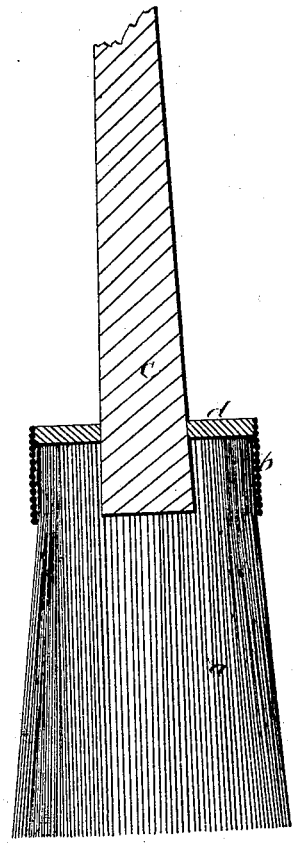
Witnesses.
Henry C. Houston
Wm. Smuklinfeavey
Inventor.
Darius White
Per M. H. Clifford atty

DARIUS WHITE, OF PORTLAND, MAINE.

Letters Patent No. 84,327, dated November 24, 1868.

IMPROVED PAINT-BRUSH.

The Schedule referred to in these Letters Patent and making part of the same

*To all whom it may concern:*

Be it known that I, DARIUS WHITE, of Portland, in the county of Cumberland, and State of Maine, have invented a new and useful Improved Paint-Brush; and I hereby declare the following to be a full, clear, and exact description thereof, which will enable others to make and use the same, reference being had to the accompanying drawings, forming part of this specification, in which is shown a sectional elevation of my invention.

In making brushes of this description, great difficulty has always been experienced from the liability of their handles to become loose and come out after being in use for a short time. The handles are also liable to become loose from the shrinkage of the bristles before being used, and while still in the hands of the dealer.

Many attempts have been made to obviate this, but no device has been found which will do it effectually. My invention has this end in view. I effect this by inserting in the top of the wire, which is wound round the bristles, a leather disk, through which the handle of the brush is driven. The handle expands the disk and forces it into the creases between the wires, by which it is held firmly in place, said wires acting as a female screw.

Reference to the drawings shows more fully the details of my invention.

*a* shows the bristles.

*b*, the wire, which is wound around them to retain them in position.

*c*, the handle of the brush.

*d*, the disk, of leather or any like substance.

The smaller end of the brush-handle is inserted in the hole in the centre of the disk *d*, and the handle is then driven upward therein until, by the conical form of said handle, the handle is firmly wedged into the disk *d*, and by the expansible properties of the leather, the disk tightly fills the creases between the wires *b*, and is made rigid, or nearly so, therein. Thus the handle is firmly held in its position, and so, while performing its usual duties of securing the bristles, is little likely to become loose from use or from shrinkage of the bristles, from the adhesive and elastic nature of the disk surrounding it.

The bristles are cemented to the cap, as common.

What I claim as my invention, and desire to secure by Letters Patent, is—

The disk *d*, when made of leather, or any equivalent substance, when used in the manufacture of brushes, in the manner as and for the purposes specified.

DARIUS WHITE.

Witnesses:
HENRY C. HOUSTON,
WM. FRANKLIN SEAVEY.